Sept. 11, 1956
F. J. HALL
2,762,388
WALL SERVICE FITTING
Filed June 19, 1952
2 Sheets-Sheet 1
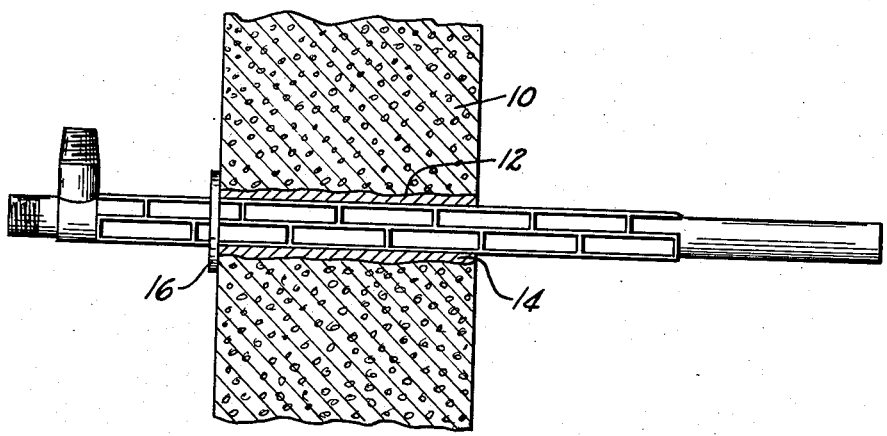
FIG.1
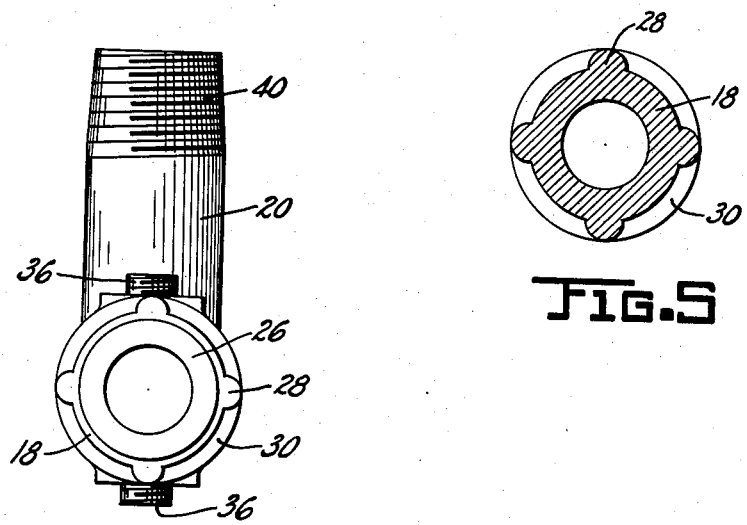
FIG.4
FIG.3
FRANK J. HALL.
INVENTOR.
BY Eugene C. Knoblock
ATTORNEY.

Sept. 11, 1956     F. J. HALL     2,762,388
WALL SERVICE FITTING
Filed June 19, 1952.     2 Sheets-Sheet 2
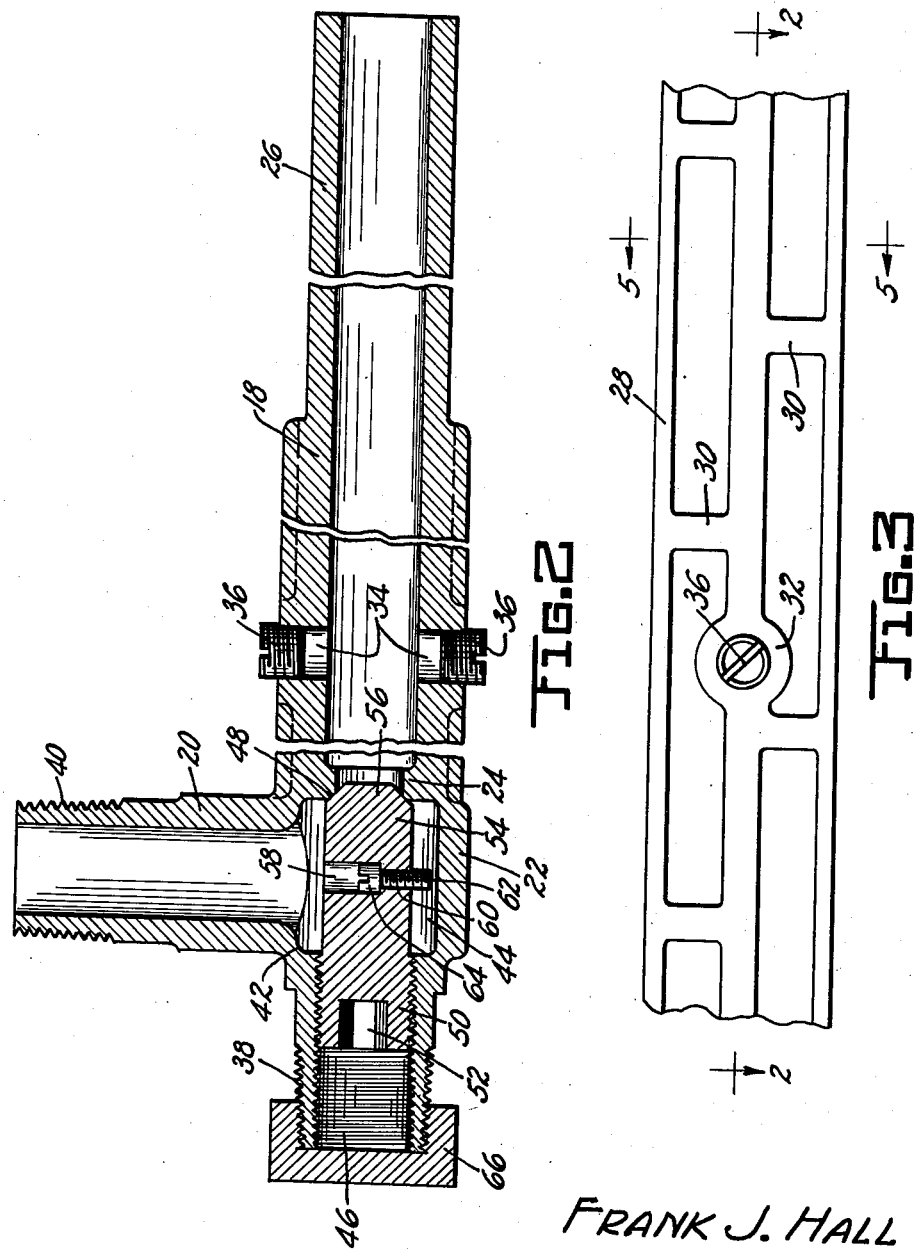
FRANK J. HALL
    INVENTOR.
BY Eugene C. Knoblock
    ATTORNEY.

United States Patent Office 2,762,388
Patented Sept. 11, 1956

2,762,388

WALL SERVICE FITTING

Frank J. Hall, Detroit, Mich., assignor to M. B. Skinner Company, South Bend, Ind., a corporation of Indiana Application June 19, 1952, Serial No. 294,461

1 Claim. (Cl. 137—360)

This invention relates to improvements in wall service fittings, and more particularly to a wall service fitting which can be used to enter the basement wall of a building, such as a residence, to supply gas or water service to the building.

A substantial amount of time and effort is now required to make a connection with a main or service conduit at a building, such as a new residence. Much of the work and difficulty which is experienced occurs at the point at which a service line passes through the wall of a basement of a building. The practice at present in effecting this service connection at the wall of the building is to use standard pipe fittings and parts, of which a large number are required. Thus in a gas service installation, a length of pipe is passed through the wall of the building; a T-fitting is mounted upon the inner end of that pipe; a short pipe length or union is connected with one leg of the T and a plug is mounted on the other leg of the T; a tamperproof valve is connected to the union; another pipe section or union is connected to the valve and has a regulator mounted thereon; and another union or pipe section is connected to the regulator, and in turn has connection with the meter, and the lines for distributing gas in the building extend from that meter. A substantial amount of labor is entailed in this type of installation, toegther with a substantial expense for parts. Furthermore, at the time of the installation, especially where the wall is erected and then a hole drilled to receive the service fitting, no provision is made to insure maintenance of the desired rotative position of the parts or to prevent longitudinal displacement of the fitting subsequently incident to the laying of a conduit between the building wall and the main and the connection of the conduit and the fitting.

The primary object of this invention is to provide a novel and simple wall service fitting which will permit reduction in the number of parts which must be handled and carried in stock or upon a service truck for the purpose of effecting a wall service connection.

A further object is to provide a device of this character having incorporated therein a novel temperproof valve which is readily manipulated between open and closed position, but which cannot be manipulated in a manner to permit connection of a by-pass line thereat.

A further object is to provide a device of this character which is so constructed that it may be positioned in a manner to prevent rotation when installed in a building wall and in a manner to provide a guide for its positioning with reference to a wall, and in a manner to resist its displacement lengthwise in a longitudinal direction.

Other objects will be apparent from the following specification.

In the drawing:

Fig. 1 is a view illustrating the device mounted in a wall.

Fig. 2 is an enlarged longitudinal axial sectional view taken on line 2—2 of Fig. 3.

Fig. 3 is a fragmentary view of the device in side elevation, illustrating the exterior contour of a part thereof.

Fig. 4 is an end view of the device as viewed from the right in Fig. 2.

Fig. 5 is a transverse sectional view taken on line 5—5 of Fig. 3.

Referring to the drawings which illustrate the preferred embodiment of the invention, the numeral 10 designates a building wall through which my improved fitting is adapted to extend, as illustrated in Fig. 1. The fitting may be imbedded in a wall as it is built, as in the case of a poured concrete foundation, or may extend through a passage 12 drilled or otherwise formed in the wall, and into which the fitting is positioned and anchored by means of grouting 14 filling the opening around the fitting. The fitting normally will be provided with a flange 16 intermediate its length which is adapted to be positioned in engagement with the inner surface of the wall 10 around the opening 12. The flange 16 will be so positioned relative to the length of the unit as to guide the insertion or mounting of the unit within the wall, and also to prevent or resist longitudinal displacement of the fitting outwardly through the wall upon the application of a pulling stress at the outer end of the fitting.

The fitting preferably constitutes a casting formed of malleable iron having an elongated tubular portion 18 and a branch conduit 20 formed integrally with part 18 and communicating with the bore of the tube portion 18 between the ends of the tube portion 18 and preferably adjacent to one end thereof. The tube portion 18 is preferably enlarged at 22 at the point at which the branch conduit portion 20 projects. An internally projecting annular flange 24 is formed in the conduit 18 at the junction of one end of the enlargement 22 with the main portion of the tubular body part 18.

The exterior shape and configuration of the device includes a plain cylindrical end portion 26 at the end of the conduit 18 remote from the enlargement 22 and the branch 20. This plain tubular portion 26 is preferably unthreaded for connection thereof to another line conduit by means of a compression type of fitting. It will be understood, however, that the end of the part 26 may be externally screw-threaded to receive and be connected to a screw-threaded pipe fitting, such as a union, an L, or a T-fitting. The portion of the conduit 18 between the plain part 26 and the enlarged part 22 is externally ribbed. The external ribs preferably include a plurality of longitudinally extending ribs 28 and transverse ribs 30 extending between the longitudinal ribs, but in staggered relation to one another, as best illustrated in Fig. 3. If desired, at a point substantially midway between the branch conduit 20 and the outer end of the conduit portion 26, a pair of diametrically opposed bosses 32 may be formed, having axially aligned transverse passages 34 formed therein. These passages are preferably screw-threaded and receive screw-threaded sealing plugs 36. The function of the plugs 36 is to seal and close the passages 34, which passages have been formed in the casting operation by cross cores whose purpose and function was to position the core for the bore of the conduit 18 substantially straight and centered in the casting cavity. In other words, because of the length of the unit and the interior configuration of the bore which necessitates the use of a sand core, support for that core at its center is necessary in the casting operation, and the cross core support used for this purpose results in the formation of the cross bores 34 which must be sealed in the use of the device. The formation of the boss around the cross bore serves to strengthen the tube at the point at which the cross bores occur, thereby compensating for the weakness introduced by the cross bores. The exterior surface of the reduced left-hand portion of the tube as viewed in Fig. 2 is preferably plain but is externally screw-threaded at 38. The exterior surface of the branch conduit 20 is preferably plain but is externally screw-threaded at its free end portion at 40. The transverse exterior flange 16 will be positioned at a predetermined distance from the branch conduit 20, for example, approximately six inches therefrom and will be positioned at an intermediate point along the longitudinal casting ribs 28.

An internal annular shoulder 42 is formed in the device at the end of the portion 22 opposite the flange 24 and cooperating with the flange 24 and with the enlargement 22 to define a chamber portion 44 of larger diameter than the interior or bore portion of the remainder of the tube portion 18. The tube portion 18 is interiorly screw-threaded at 46 throughout its length from its left-hand end as viewed in Fig. 2 to the shoulder 42. A conical valve seat 48 is formed in the annular flange or rib 24 facing the chamber 44, the same being concentric with the internal screw-threaded portion 46. The interior or bore of the remaining portion of the conduit 18, that is, in the portion thereof from the rib 24 to the right-hand end thereof as viewed in Fig. 2, may be plain.

A valve plug, preferably formed of brass or other material resisting corrosion, has a screw-threaded end portion 50 provided with an end socket 52 of non-circular cross-sectional shape and adapted to receive a non-circular tool for rotating the valve plug. The main body portion 54 of the plug is of plain cylindrical shape and of a dimension slightly less than the threaded portion 50 thereof. The plain portion 54 is preferably of a length substantially equal to the longitudinal dimension of the enlarged valve chamber 44. At its inner end the valve plug is tapered or of frusto conical form at 56 adapted to seat and mate in the conical valve seat 48. Substantially centrally of the plain valve portion 54 is formed a transverse bore 58 having a reduced diameter screw-threaded portion 60. A pin or screw 62 of a length substantially equal to and not greater than the diameter of the portion 54 or of the crest diameter of the threaded part 46 of the bore is screw-threaded in reduced portion 60 of the cross bore, said screw having an enlarged head 64 of a size to have a snug rotatable fit in the bore portion 58 and serving to limit the extent to which the pin 62 can be threaded to project laterally from the valve body 54.

The screw-threaded part 50 of the valve plug is of a length approximately one-half the total length of the screw-threaded portion 46 so that the valve 54 may move from the seated position illustrated in Fig. 2 to a position leaving the valve seat passage 48 fully open while the valve remains completely confined within the tube 18. Thus, either in open or closed position of the valve, it is possible to use a sealing cap 66 closing the inner end of the conduit 18 while in use.

The device will be accurately positioned and held in the wall after installation whether imbedded in the wall when a poured concrete wall is formed, or when passed through a drilled hole in a wall and sealed therein by the use of grouting 14, as shown in Fig. 1. Any pull exerted upon the end portion 26 incident to connection of a line leading to a main is fully sustained and successfully resisted by the flange 16 which bears upon the inner face of the wall 10. Consequently, danger of damage to the device and to the service fitting and connected parts caused by an externally exerted pull upon the fitting is successfully avoided. The position of the device in the wall is accurately gauged by the flange 16 so that the branch fitting 20 will be spaced a convenient distance from the wall to facilitate the mounting and connection of the regulator and gas meter and associated parts to the branch conduit 20. The position or angle at which the branch 20 extends from the conduit is held accurately by reason of the ribs 28, 30 which are imbedded in the concrete of the wall or the grouting 14 and entirely resist rotation of the service fitting. The ribs also serve to strengthen and rigidify the fitting, and, when formed of malleable iron as preferred, will successfully resist corrosion to which iron and steel are sometimes subjected when contacting concrete.

After the device has been installed and the valve plug has been threaded into the end of the bore 46, the plug can be locked in place within the conduit portion 18 in a manner to be rendered tamperproof. For this purpose the plug is positioned in a rotative position with the cross bore 58 substantially in axial alignment with the branch conduit 20 and in communication therewith. The pin 62 will have been positioned in the plug to be completely confined within the contour of the plug to facilitate the insertion of the plug and its threading to place in the device. The user can then insert a tool through the branch 20 and into engagement with the head 64 of the pin to rotate that pin to a position as illustrated in Fig. 2, projecting laterally from the valve plug at its screw threaded end 62. The shoulders at the head 64 and at the junction of the bore parts 58 and 60 are so related as to limit the extent to which the pin can be projected so that the pin is prevented from contacting the wall of the enlarged chamber 44. The pin 62 is so positioned that, when the valve is fully seated at the valve seat 48 to close and prevent communication between the branch conduit 20 and the main conduit 18 past the valve seat 48, the pin 62 will be spaced from the shoulder 42 a substantial distance. Consequently, the valve can be manipulated to a fully open position while the pin 62 remains projected, its opening movement being limited, however, by engagement of the projecting portion of the pin with the shoulder 42 before the outer end of its threaded portion 50 projects beyond the outer end of the screw-threaded portion 38 of the conduit 18. The cap can be removed for manipulation of the valve but the valve plug cannot be completely removed when the pin 62 is in the projecting position shown. In this way the valve is rendered tamperproof and there is no possibility that a branch line can be surreptitiously or otherwise connected at 38 to by-pass a meter. At the same time it is possible, if necessary for access to the line 26 as for the purpose of rodding the same to remove dust and dirt accumulated therein, upon disconnection of the units carried by the branch 20 so as to give access to a tool to the head 64 of the pin, to back off the pin 62 to be fully confined within the cross-sectional outline of the plug 54, whereupon the valve plug can be completely removed.

The external screw-thread 40 upon the end of the branch conduit 20 provides means to which the usual gas regulator can be connected directly. Thus the device provides one simple unit for connection of the line to the main extending exteriorly of the building and the regulator within the building, thereby materially reducing the number of parts which must be carried by the service installer as compared to the present practice, and which include fittings, separate valve units and the like, as explained above.

While the construction herein disclosed constitutes the preferred embodiment of the invention, it will be understood that changes may be made in the construction within the scope of the appended claim without departing from the spirit of the invention.

I claim:

A wall service fitting adapted to be mounted in a building wall for connection with a fluid supply conduit leading to the building and with an interior fluid distribution conduit network, comprising an elongated tubular body having an externally ribbed portion between its ends to extend through a building wall, said body being of a length to terminate spaced from said wall at its ends and having an open ended bore, a lateral tubular projection cast integrally with said body between its ends and spaced from said wall-mounted portion, the bore of said body being enlarged at an intermediate part thereof spaced from its ends to define spaced integral interior shoulders, said lateral projection having a bore communicating with the enlarged portion of said first bore between said shoulders, a valve member screw-threaded in and confined by one end portion of said tubular body and adapted to span said enlarged bore portion to seat against the shoulder between the opposite end of said tubular body and the enlarged bore portion, and a stop carried by said valve member and projecting into said enlarged bore portion for engagement with the other shoulder when said valve member is in open position said stop constituting a screw having an enlarged head and of a length less than the diameter of the bore of said body, said valve member having a transverse stepped bore screw-threaded for a portion of its length to define a shoulder engageable by said screw head to limit the projection of said screw from said transverse bore, said bore being located in a portion of said valve member adapted for alignment with the bore of said transverse projection.

References Cited in the file of this patent

UNITED STATES PATENTS

| | | |
|---|---|---|
| 362,326 | Smith | May 3, 1887 |
| 536,801 | Gaghan | Apr. 2, 1895 |
| 848,178 | Kingsley | Mar. 26, 1907 |
| 942,541 | Carlson | Dec. 7, 1909 |
| 1,195,830 | McWane | Aug. 22, 1916 |
| 1,495,403 | Davis | May 27, 1924 |
| 1,560,296 | Mahaffey | Nov. 3, 1925 |
| 1,652,929 | Cawood | Dec. 13, 1927 |
| 1,678,927 | Weatherhead | July 31, 1928 |
| 2,346,938 | Oravec | Apr. 18, 1944 |
| 2,625,173 | Hodes | Jan. 13, 1953 |

FOREIGN PATENTS

| | | |
|---|---|---|
| 55,924 | Austria | Oct. 25, 1912 |
| 280,842 | Italy | Dec. 22, 1930 |